United States Patent [19]
Förster

[11] 3,806,799
[45] Apr. 23, 1974

[54] ARRANGEMENT FOR DETERMINING OPTIMUM PHASE POSITION WHEN SORTING WORKPIECES BY THE EDDY CURRENT TEST METHOD

[76] Inventor: Friedrich M. O. Förster, Grathwohlstrasse 4, 7410 Reutlingen, Germany

[22] Filed: Mar. 8, 1973

[21] Appl. No.: 339,356

[30] Foreign Application Priority Data
June 20, 1972  Germany.............................. 2229963

[52] U.S. Cl. ................................................ 324/40
[51] Int. Cl............................................. G01r 33/00
[58] Field of Search................................. 324/34, 40

[56] References Cited
UNITED STATES PATENTS
2,806,992   9/1957   Foerster................................ 324/34

Primary Examiner—Alfred E. Smith
Attorney, Agent, or Firm—Ervin B. Steinberg

[57] ABSTRACT

A pair of superposed plane elements adapted to be fitted over the screen of a cathode ray tube or used for plotting purposes are employed for determining optimum phase position when sorting workpieces by the eddy current test method. Preferably the elements are transparent, one rotatable relative to the other, and include graduations in degrees of angle and a grid of parallel lines.

18 Claims, 7 Drawing Figures

PATENTED APR 23 1974 3,806,799

ARRANGEMENT FOR DETERMINING OPTIMUM PHASE POSITION WHEN SORTING WORKPIECES BY THE EDDY CURRENT TEST METHOD

BACKGROUND OF THE INVENTION

This invention relates to an arrangement for determining the optimum phase position during the sorting of workpieces when the result of the inspection of a plurality of such workpieces sorted according to certain characteristics is available on a surface in the form of dots representing the individual workpieces, and the location of the dots relative to one another is indicative of the characteristics of the workpieces.

U.S. Pat. No. 2,806,992 issued to the present applicant describes a device which permits inspection and sorting of mass-produced parts. According to the patent, workpieces to be inspected are subjected to the alternating magnetic field of a test coil which induces eddy currents in the workpieces. The electrical loading effect of the eddy currents on the coil depends greatly on the electrical and magnetic characteristics of the specimens, as well as the mechanical characteristics related thereto. The magnitude and phase position of electrical test voltages derived from the loading effect of the eddy currents on the coil contain information indicative of the characteristics of the specimens. Two phase-selective rectifiers are used to produce proportional direct current signals of two 90° out of phase components of this test voltage, such direct current signals being then applied to the horizontal and vertical deflection plates of a cathode ray tube. In this manner, it is possible to depict the peaks of the vectors of the test voltage as spots of light on the screen of a cathode ray tube, whereby an image spot at the center of the screen not influenced by any deflecting votage indicates the common location of the ends of the vectors. A quantity of specimens with differing characteristics, therefore, is represented by an equal quantity of image spots which may be distributed over the entire screen of the cathode ray tube. If these specimens are to be sorted into $n$ groups, by dividing the surface of the screen by $n-1$ imaginary vertical lines for example, such sorting will readily be possible by a corresponding evaluation of the voltage at the horizontal deflection plates.

A sorting problem which often occurs relates to separating specimens which have differing alloy compositions as a result of intermixed materials. In such instances, inspection by eddy currents often is the only available nondestructive method for separating the specimens. This is accomplished in that a quantity of specimens of each type of alloy in question are procured and fed into the test coil, one after the other, and their respective image spots are entered on a transparent sheet affixed to the cathode ray tube screen. This provides a quantity of groups of spots corresponding to the quantity of types of alloys. However, initially these groups generally are not associated with one another in such a manner that they can be separated from one another by rigidly located sorting boundaries, extending vertically for example. It is first necessary, therefore, to alter the phase location of the control voltage of the phase-sensitive rectifiers, causing the groups of spots to rotate around the center of the scope screen in such a manner that it will be possible to separate the individual groups by means of the sorting boundaries. In order to provide reliable sorting, it is desirable also that the projection of the smallest distance between two neighboring groups on a line which is perpendicular to the sorting boundaries by a maximum. After several attempts the phase control can be set to this optimum position. However, in experience it is extremely time consuming to replot the pattern of spots, at least partially, after every change in the phase position.

In addition to the arrangement just described, modifications are also known in which the direct current signals derived from the two perpendicular components of the test voltage are not applied to the deflecting plates of a cathode ray tube, but to two meters. It is also possible to apply the above described direct current signals in sequence to a single meter, with digital indication for example, and to note the respective reading caused by a specimen. If the readings are plotted in a rectangular coordinate system, it is possible in the same manner as with the cathode ray tube arrangement to produce a dot image for a quantity of specimens, the location of the dots relative to one another being indicative of the characteristics of the specimens.

It is obvious to employ in connection with the last described arrangements one of the two direct current signals for sorting the specimens into a quantity of groups. Once again, this requires that the phase position of the control voltage of the phase-selective rectifiers has been set to an optimum sorting phase position. However, determining this optimum sorting phase position proves to be even more time consuming than in the previously described case. It is a principal object of this invention, therefore, to provide an arrangement which permits a rapid and simple determination of the optimum phase position when sorting workpieces.

In accordance with the present invention the above stated problems are solved by an arrangement which comprises two plane elements which are adapted to be superposed upon one another and which are rotatable around a common reference point or origin. At least one element is made of transparent material and one of the two elements is suitable for the entry of peaks of test voltage vectors whose common origin is the above mentioned reference point. The other of the two elements contains a quantity of parallel lines. At least one of the two elements is graduated in degrees to enable the relative angle of rotation between the two elements to be read.

An arrangement of this type can be employed advantageously in a device in which the image dots indicative of the specimen characteristics appear as luminous spots on the screen of a cathode ray tube as well as in devices in which the image dots are obtained by plotting measured values in a coordinate system.

In the first case, the arrangement in accordance with the present invention can comprise two matching plane elements of acrylic sheet material superposed on each other and disposed in the circular aperture in front of the screen of the cathode ray tube. However, instead of the described lower element, it is possible also to use a sheet of tracing paper which is fastened to the front of the screen by a ring.

In the case of the embodiment omitting the cathode ray tube, the arrangement according to the invention can comprise a sheet of paper with a printed coordinate grid, and a plate of a somewhat stiffer material placed upon the paper in such a manner that the plate is rotatable on the sheet.

The invention will be described now and explained in greater detail with reference to the drawings.

DETAILED DESCRIPTION OF THE INVENTION

Figure 1:
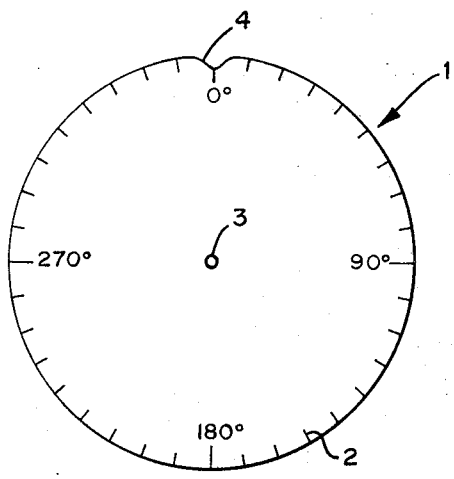
FIG. 1 is a plan view illustrating a transparent element for transferring the image light spots from the screen of a cathode ray tube.

Referring now to the drawings, the element or plate 1, FIG. 1, comprises, for example, clear transparent acrylic sheet material, approximately 1 mm thick. The relatively small thickness of only 1 mm is preferred in order to avoid parallax errors when transferring the image spots from the screen of a cathode ray tube as dots or indicia to the plate 1. Engraved on the edge of the plate is a scale 2 providing degree markings which can represent the 360° graduation of a circle.

A small, engraved circle 3 indicates the center of the plate 1. Since the plate 1 is placed into the aperture in front of the screen of a cathode ray tube (not shown) and concentric with the screen, circle 3 also represents the center of the screen. The angular orientation of the plate relative to the screen is fixed by an indentation 4 in the plate 1. A ridge disposed in the aperture in front of the screen mates with the indentation 4.

Figure 2:
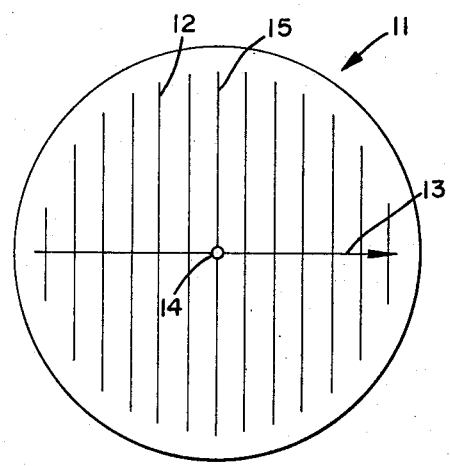
FIG. 2 is a plan view showing a plate adapted to be rotated relative to the element of FIG. 1.

FIG. 2 shows another plate 11 which preferably comprises transparent acrylic sheet material. The plate 11 is somewhat thicker than the plate 1. A quantity of equally spaced parallel lines 12 are engraved on the underside of plate 11. An arrow 13, which is also engraved in the underside of plate 11, indicates the optimum position of the phase angle when sorting workpieces. The arrow extends at right angles to the lines 12 and passes through the circle 14 which marks the center of plate 11.

Figure 3:
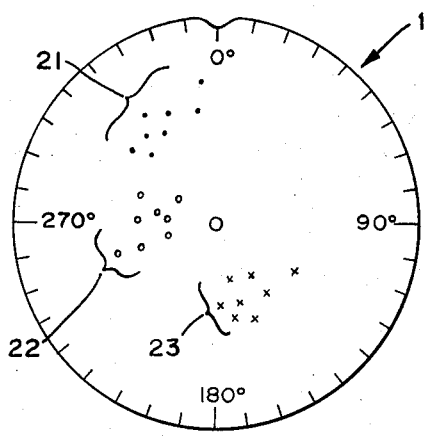
FIG. 3 shows the element according to FIG. 1 with image responsive indicia applied thereupon.

FIG. 3 again depicts plate 1, FIG. 1, upon which a quantity of image dots representing workpieces have been plotted in the position apparent on the cathode ray tube screen. The workpieces represent specimens belonging to three groups of different alloys. Marking pencils with different color are used for plotting according to the groups to which the specimens belong, represented by respective dots, circles and crosses. In FIG. 3 groups 21, 22 and 23 appear clearly separated from one another. However, it is not possible to separate the groups by vertically extending boundaries. To accomplish this, it is first necessary to rotate the image pattern, or change the phase position of the control voltage of the two components of the test voltage applied to the phase selective rectifier.

Figure 4:
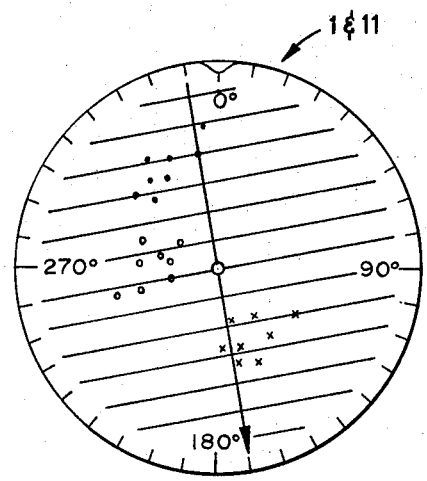
FIG. 4 shows the elements according to FIGS. 1 and 2 disposed one above the other.

FIG. 4 shows the two plane elements 1 and 11 of FIGS. 1 and 2 with plate 11 superposed concentrically upon plate 1. Pointing to about 170° on scale 2, arrow 13 indicates the optimum position of the phase for sorting. To determine this optimum phase position it is necessary to rotate the plate 11 relative to the plate 1 until the distance along the direction of arrow 13 between the two groups of indicia which are located closest to each other (in this instance groups 21 and 22) becomes a maximum, or is at least as long as the distance between the groups 22 and 23, also in the direction along arrow 13. The distance between two respective groups in the direction of arrow 13 is determined by projecting the two closest indicia of both groups, e.g. the lowest indicium of group 21 and the upmost indicium of group 22, upon arrow 13, that is, transferring the indicia parallel to the line 12 upon arrow 13, and by measuring the distance between the projected indicia. In other words, the plate 11 is rotated until either the distance between the two closest indicia of groups 21 and 22 projected upon arrow 13 attains its maximum value or becomes at least as long as the distance between the two closest indicia of groups 22 and 23, projected upon arrow 13. This latter alternative is significant if, as the plate 11 is rotated, the distance between groups 22 and 23 in the direction along arrow 13 starts to decrease before the distance between groups 21 and 22 along the direction of arrow 13 reaches a maximum.

When performing this operation, the parallel lines 12 provide in a simple manner a sufficiently accurate measurement of the distance between two indicia along the arrow 13 for every angle of rotation of plate 11. Moreover, it is not necessary that an arrow 13 be visible on plate 11 in every instance. If there is none, the line 15 passing through the center 14 is employed for reading the desired angle on scale 2, however, the markings on scale 2 must then be displaced by 90°.

Figure 5:
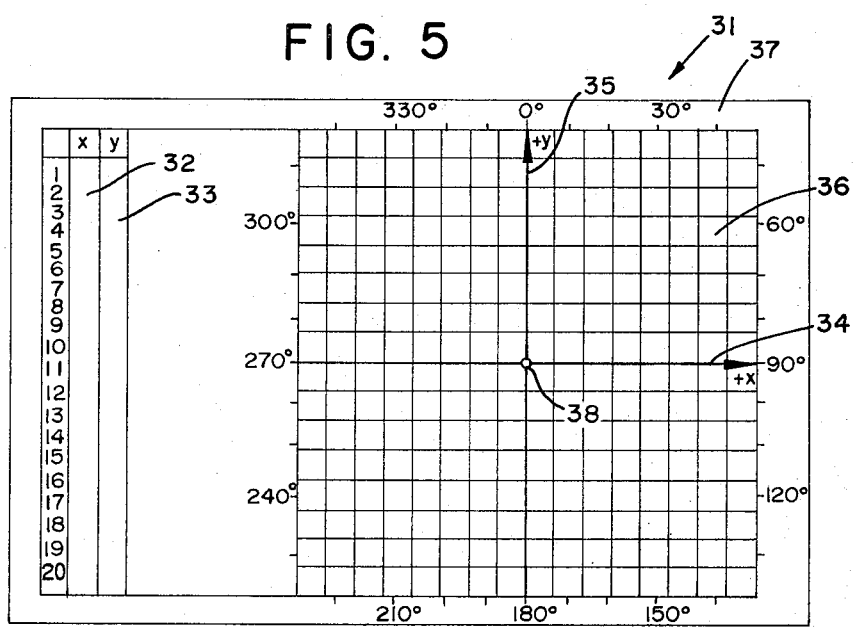
FIG. 5 is a plan view of a form for entering image responsive dots or indicia.
Figure 6:
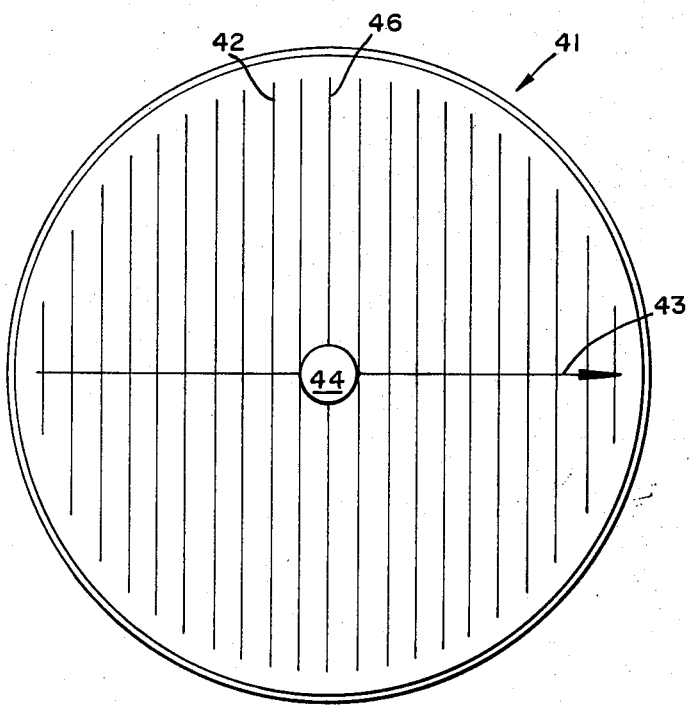
FIG. 6 shows a rotatable plate for use with the form according to FIG. 5.
Figure 7:
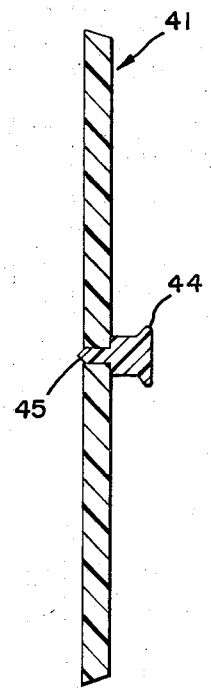
FIG. 7 is a cross-sectional view of the plate illustrated in FIG. 6.

FIGS. 5 to 7 disclose an arrangement which is primarily employed with those instruments in which the two components of the test voltage are not indicated as light spots on the screen of a cathode ray tube, but as readings on a meter. FIG. 5 shows a printed form 31, which is generally made of paper. The measured values of the components of the test voltage, called $x$ and $y$ in this instance, which have been determined for a number of specimens, can be entered in columns 32 and 33. The $x$ and $y$ values are then plotted in a coordinate system, comprising the $x$ axis 34, the $y$ axis 35 and the grid 36. If marking pencils with different colors are employed for plotting the values of specimens belonging to various sorting groups, a dot pattern results which is similar to that shown in FIG. 3. The grid 36 is surrounded by graduation markings denoting degrees of angle.

Plate 41, which is shown in a top plan view in FIG. 6 and in section in FIG. 7, comprises acrylic plastic material. Engraved in the underside plate 41 is a quantity of equidistant parallel lines 42 as well as an arrow 43 extending at right angles to the lines 42 and through the center of the plate 41. A knob 44 on the top of plate 41 permits plate 41 to be manipulated. The tip 45 of the knob 44 provides centering of the plate.

After the dot pattern has been plotted on the coordinate system of form 31, plate 41 is superposed on the form 31 in such a manner that the centering tip 45 rests on the origin of the coordinates 38. The angle of optimum phase position for sorting can be determined, as described above, by rotating the plate 41 and simultaneously observing the projection of the distances between the adjacent groups of indicia.

It will be seen that the above described arrangements provide a very simple and inexpensive means for determining the optimum phase position when sorting workpieces using the eddy current test method previously disclosed.

What is claimed is:

1. Means for determining the optimum phase position of the control signal applied to phase sensitive rectifiers which produce two 90° out of phase components of test signal vectors when testing and sorting a plurality of workpieces for predetermined properties by means of an eddy current apparatus comprising in combination:

a pair of superposed plane elements;

means causing one of said elements to be rotatable relative to the other about a common reference point;

at least one of said elements constructed of transparent material and one of said elements adapted to be marked with indicia representing the peaks of test signal vectors whose common origin is said reference point;

a set of parallel lines disposed on said other element, and at least one of said elements having indicia in the form of angular divisions for determining the relative angular displacement between both elements.

2. Means for determining the optimum phase position as set forth in claim 1, said elements being dimensioned for fitting over the face of a cathode ray tube screen.

3. Means for determining the optimum phase position as set forth in claim 1, said pair of elements being made from transparent material.

4. Means for determining the optimum phase position as set forth in claim 3, and one of said elements having means at its periphery for precluding its rotation.

5. Means for determining the optimum phase position as set forth in claim 4, said one element having said means for precluding rotation having also said angular divisions along its peripheral margin, the other element being mounted for rotation relative to said one element and being provided with said parallel lines equidistantly spaced from each other.

6. Means for determining the optimum phase position as set forth in claim 5, a centrally disposed one of said parallel lines adapted to be used for determining optimum phase position.

7. Means for determining the optimum phase position as set forth in claim 5, said other element having said parallel lines including a further line disposed normal to said parallel lines adapted to be used for determining optimum phase position.

8. Means for determining the optimum phase position as set forth in claim 5, said parallel lines disposed on said other element being located on the underside of the element facing the superposed element.

9. Means for determining the optimum phase position as set forth in claim 3, and a knob located in the center of the element which is rotatable.

10. Means for determining the optimum phase position as set forth in claim 3, and a centering tip disposed in the center of the element which is rotatable.

11. Means for determining the optimum phase position as set forth in claim 1, one of said elements comprising a form of paper or paper-like material.

12. Means for determining the optimum phase position as set forth in claim 11, said form being provided with a rectangular coordinate system.

13. Means for determining the optimum phase position as set forth in claim 12, said form including further divisions in degrees of angle disposed about the origin of the coordinates.

14. Means for determining the optimum phase position as set forth in claim 11, the other one of said elements being made of transparent sheet material and being provided with a quantity of equidistant parallel lines.

15. Means for determining the optimum phase position as set forth in claim 14, the centrally disposed line of said parallel lines being adapted for determining optimum phase position.

16. Means for determining the optimum phase position as set forth in claim 14 and including a line disposed perpendicular to said equidistant parallel lines and extending through the center of said element.

17. Means for determining the optimum phase position as set forth in claim 14 and a knob disposed in the center of the element which is rotatable.

18. Means for determining the optimum phase position as set forth in claim 14 and a centering tip disposed on the element which is rotatable.

* * * * *